May 27, 1958  C. E. WEBBE  2,836,200

FLEXIBLE CORRUGATED METAL HOSE ASSEMBLY

Filed Feb. 26, 1954

INVENTOR
CHARLES E. WEBBE

BY

ATTORNEYS

United States Patent Office 2,836,200
Patented May 27, 1958

2,836,200

FLEXIBLE CORRUGATED METAL HOSE ASSEMBLY

Charles E. Webbe, Waterbury, Conn., assignor to The American Brass Company, Waterbury, Conn., a corporation of Connecticut Application February 26, 1954, Serial No. 412,699

2 Claims. (Cl. 138—61)

This invention relates to corrugated flexible metal hose assemblies. More particularly it relates to an improved assembly of such hose with a welded or brazed type fitting, characterized by the provision of resilient means for limiting flexure of the hose corrugations where they have been softened by annealing as a result of welding or brazing the fitting to the hose.

When a fitting is welded or brazed to a corrugated flexible metal hose, a section of the hose near the weld is annealed in varying degrees. It has been found that such annealing of the hose contributes to its early failure when the assembly is subjected to vibration or repeated flexure. It has been customary heretofore to surround the end portion of the hose with a rigid metal ferrule, which helps to restrain the annealed corrugations from flexing. This practice, however, has not sufficed to prevent failure of the hose, for generally failure occurs by fatigue cracking of the metal at one of the corrugations disposed within the rigid ferrule (if the ferrule is somewhat loose) or else by fatigue cracking of the metal at a corrugation just beyond the rigid ferrule (if the ferrule is tight).

I have discovered that failures of these types can be minimized if the annealed hose corrugations underlying a rigid ferrule are resiliently restrained against flexure. Based on this discovery, the invention provides an improved combination with a flexible corrugated metal hose (which may be surrounded with a braid) and a fitting welded or brazed to one end thereof, of a metal ferrule which surrounds the end portion of the metal hose, the forward end of the ferrule being welded or brazed to the end of the hose. In the new combination, a resilient sleeve, of rubber or like material, is inserted between the hose and the rearward end portion of the ferrule. The rearward end portion of the ferrule is then swaged down on the sleeve so that the latter is compressed tightly against the hose (and braid, if such is employed). Thus the corrugations of the hose underlying the ferrule are resiliently restrained against flexure.

A preferred embodiment of the present invention is shown in the accompanying drawings in which—

Figure 1:
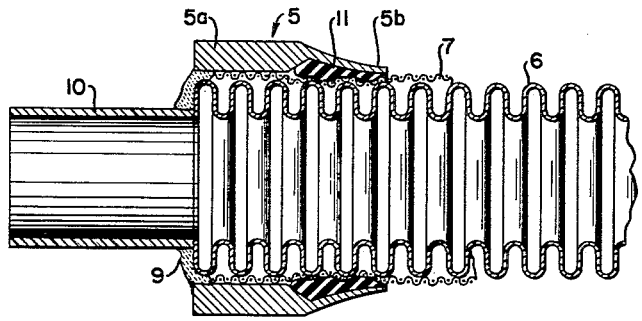
Figure 2:
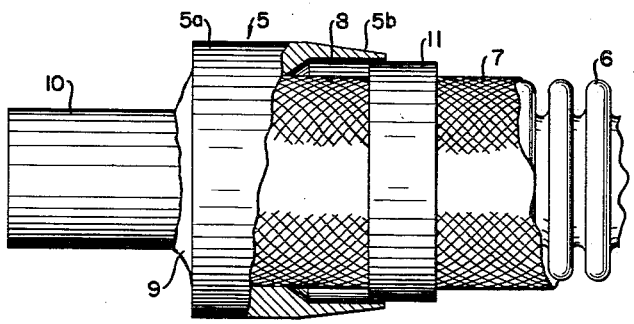

Fig. 1 is a longitudinal section through a corrugated hose and fitting assembly according to the invention; and Fig. 2 is an elevation, partially in section, of the new assembly at an intermediate stage of manufacture.

In the assembly shown in Figs. 1 and 2, a generally cylindrical metallic ferrule 5 surrounds the end portion of a length of a flexible corrugated metal hose 6. The hose is reinforced by a wire braid 7, and the ferrule 5 surrrounds the braid as well as the hose itself. The forward end portion 5a of the ferrule, adjacent the end of the hose, has an inside diameter substantially the same as the outside diameter of the hose and braid and thus it fits snugly around that portion of the hose. The rearward end portion 5b of the ferrule is formed with an inside diameter substantially greater than the outside diameter of the hose and braid, thus providing an annular bore 8 between the hose and the rearward end portion of the ferrule (Fig. 2).

The end of the hose together with its reinforcing braid, is joined by filler metal 9, applied by a welding, brazing, or hard soldering operation, to the forward end of the ferrule. At the same time a terminal fitting 10 is securely joined to the hose 6, in fluid tight relation therewith, by the same filler metal. The welding or brazing operation involves heating the end portion of the hose to an elevated temperature above the annealing temperature of the metal of the hose, with the result that a number of the hose corrugations underlying the ferrule and near the weld are annealed to a soft condition relative to the remainder of the hose.

A sleeve 11 formed of rubber or equivalent resiliently deformable material is inserted into the annular bore 8 in the rearward end portion of the ferrule (Fig. 2). The rearward end portion of the ferrule is then swaged down on the sleeve (Fig. 1) to compress the sleeve tightly against the hose and its reinforcing braid. The degree of compression of the resilient sleeve must be sufficient so as to impose a substantial, but resilient, restraint against flexure on the corrugations of the hose. Preferably, however, such compression is not severe enough to deform the hose corrugations. By this arrangement of the ferrule and resilient sleeve, a transition region, in which a limited and restrained degree of movement of the hose corrugations can occur, is provided between the end of the hose where no flexing is permitted, and the portion of the hose beyond the rearward end of the ferrule where maximum flexing is possible. Thus, when the assembly is vibrated or flexed, the annealed portion of the hose is not allowed to flex freely, and as a result the likelihood of a break or leak occurring along the annealed portion of the hose is substantially reduced. On the other hand, the hose within the ferrule is not held so rigidly that undesirably great flexure tends to occur at the one or two corrugations directly to the rear of the ferrule; and consequently the danger of a break at this point likewise is minimized.

I claim:

1. A hose end assembly comprising a flexible corrugated metal hose, a fitting welded to one end of the hose, and a ferrule surrounding said end of the hose and welded thereto, the ferrule being of sufficient length to extend over a multiplicity of the corrugations of the hose, the inside diameter of the forward end portion of the ferrule being substantially equal to the outside diameter of the hose and the inside diameter of the rearward end portion thereof being substantially greater than the outside diameter of the hose to provide an annular bore between the hose and the rearward end portion of the ferrule, the rearward end portion of the ferrule having the larger inside diameter extending over a plurality of the corrugations of the hose, several corrugations of the hose at said one end, including corrugations lying within said rearward end portion of the ferrule, being in a soft annealed condition relative to the remainder of the hose, and a resilient sleeve disposed in said annular bore and surrounding the soft annealed corrugations of the hose therein, the rearward portion of the ferrule being swaged down on said resilient sleeve and compressing it tightly against the corrugations of the hose to resiliently restrain said corrugations, so that upon flexure of the hose only a limited degree of movement of the hose corrugations so restrained may occur.

2. A hose end assembly as set forth in claim 1 in which reinforcing braid surrounds the corrugated flexible metal hose and extends into the ferrule and within the resilient sleeve.

(References on following page)

References Cited in the file of this patent

UNITED STATES PATENTS

| | | |
|---|---|---|
| 1,900,511 | Madden | Mar. 7, 1933 |
| 2,040,834 | Parker | May 19, 1936 |
| 2,240,413 | Parker | Apr. 29, 1941 |
| 2,251,715 | Parker | Aug. 5, 1941 |
| 2,516,631 | Jacobson | July 25, 1950 |
| 2,556,544 | Johnson | June 12, 1951 |
| 2,685,459 | Panagrossi | Aug. 3, 1954 |

FOREIGN PATENTS

| | | |
|---|---|---|
| 115,465 | Austria | Dec. 27, 1929 |